June 5, 1934. D. D. KNOWLES Re. 19,199

STREET LIGHTING SYSTEM

Original Filed Aug. 22, 1928

INVENTOR
Dewey D. Knowles.
BY
Sherley Barr
ATTORNEY

Reissued June 5, 1934

Re. 19,199

UNITED STATES PATENT OFFICE 19,199

STREET LIGHTING SYSTEM

Dewey D. Knowles, Wilkinsburg, Pa., assignor to Westinghouse Electric & Manufacturing Company, a corporation of Pennsylvania Original No. 1,788,111, dated January 6, 1931, Serial No. 301,415, August 22, 1928. Application for reissue April 11, 1931, Serial No. 529,536

12 Claims. (Cl. 250—41.5)

My invention relates to control systems and particularly to circuit-controlling means employing light-sensitive cells.

It is one of the main objects of my invention to provide a control system for power consuming circuits embodying light-sensitive cells to actuate the control devices in accordance with major variations from light to darkness and vice versa, in which minor variations in light intensity shall be prevented from causing repeated energization and deenergization of the lighting units.

In practicing my invention, I provide an electromagnetic circuit controller for controlling the energization of one or more power-consuming devices, a light-sensitive cell for controlling an electro-magnetic relay and an auxiliary lighting unit, the energization of which is controlled directly by the electro-magnetic relay and secondarily by the light-sensitive cell.

In the single sheet of drawings.

Figure 1:
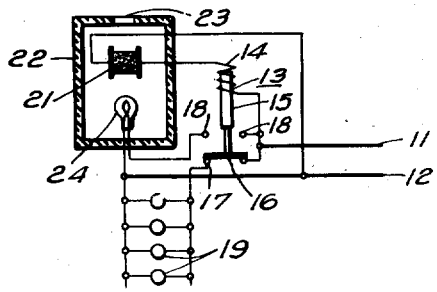
Figure 1 is a schematic illustration, partially in section, of circuits and apparatus embodying my invention.

Referring more particularly to Fig. 1 of the drawing, I have there illustrated a supply circuit comprising conductors 11 and 12, an electro-magnetic relay or contactor 13 embodying an actuating coil 14 and a core member 15 associated therewith and having secured thereto a contact-bridging member 16. A plurality of lower contact members 17 are engaged by the bridging member 16 when the coil 14 is deenergized. A pair of upper contact members 18 are engaged by the bridging member 16 when coil 14 is energized.

A plurality of lighting units 19, indicated generally only for the purpose of illustrating a power-consuming circuit, may be connected in parallel-circuit relation, relatively to each other, and their energization is controlled by the contactor 13. However, I desire it to be understood that the circuit shown is illustrative only and that any auxiliary circuit, branch circuit or controlled circuit may be substituted.

Means for controlling the actuation of the contactor 13 comprises a light-sensitive cell 21 which is shown generally only, and may, for example, be a selenium cell. It is well known that selenium has the property of having a relatively high electrical resistance when not subjected to any light, such as daylight, while its resistance decreases very appreciably if subjected to light of any appreciable intensity. The cell 21 is preferably mounted in a light-tight box 22 having an opening 23, therethrough, to permit daylight or other light to strike the cell 21 and cause it to change its electrical resistance.

An auxiliary light source is represented by a lamp 24 also located within the box 22 and so connected to the contactor 13 as to be energized when the coil 14 is energized and to be deenergized when the bridging member 16 is in operative engagement with the contact members 17, at which time the lighting units 19 are energized.

When a control system of this kind is used for street-lighting circuits, the cell 22 is to be subjected to daylight and to darkness in order to properly control the energization of the lighting units 19. It may happen, however, that the intensity of the light may rise to such value as to cause deenergization of the units 19 by reason of the decrease in the resistance of the cell 21 and the flow of current therethrough and through the coil 14 of the contactor 13. If a momentary decrease in the light intensity should be so great as to cause the resistance of the cell 21 to increase to a relatively high value, the lights would again be energized and this might happen several times, thereby causing undesired operation of the system.

Figure 2:
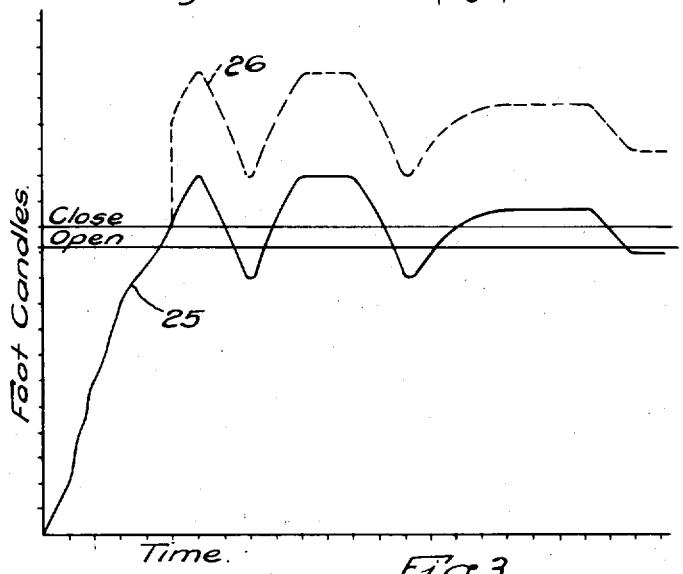
Fig. 2 is a diagram of light intensities which vary from darkness to daylight, and, Fig. 3 is a diagram showing the variation in light intensities when changing from daylight to darkness.

Referring to Fig. 2 of the drawing, I have there illustrated a curve 25 of increasing major light variations, the intensity starting at zero, or at some very low value, as may be the case during the night, and increasing up to say 35 units of intensity, which value may be sufficiently high to cause the system to operate to deenergize the units 19. This will be the case if the cell 21 is so constructed and adjusted as to decrease its resistance sufficiently when the light intensity reaches say 30 foot candles, The auxiliary light 24 will then be energized simultaneously with the deenergization of the lighting units 19, and, therefore, the curve of light intensity reaching the cell 21 will be that shown in the broken-line curve 26. Even though the light intensity should be momentarily reduced by 10 foot candles, the minimum intensity of light reaching the cell 21 will still be 35 units, which value is sufficiently high to maintain the contactor in its operated position. Several minor variations are indicated by curves 25 and 26, the minimum values in no case falling below that necessary to maintain the energization of the coil 14.

Figure 3:
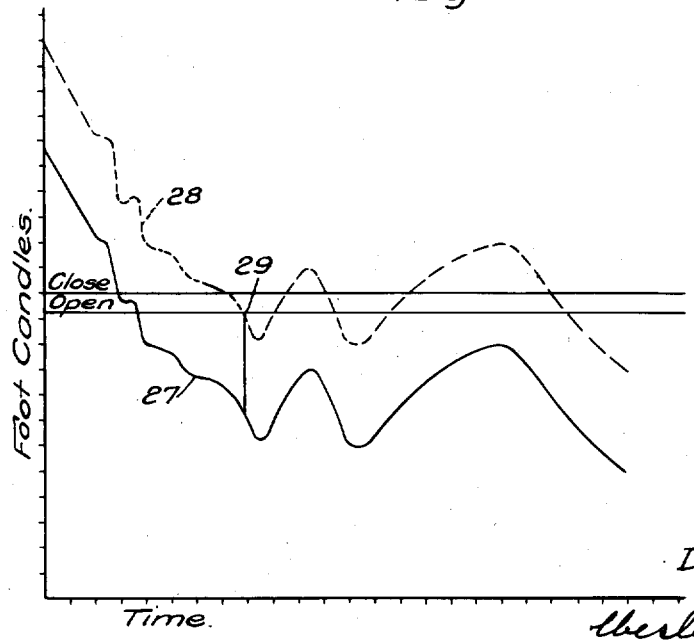

Referring to Fig. 3 of the drawing, I have there illustrated a curve of decreasing major intensity of light, such as may occur at nightfall. The broken-line curve 28 illustrates the intensity of the light reaching the cell 21, inasmuch as the auxiliary lamp 24 is still energized. Once the light intensity, as represented by curve 28, reaches a value of 28 foot candles, the resistance becomes high enough to sufficiently decrease the current traversing it and the coil 14 to permit deenergization of the coil 14 and consequent energization of the units 19.

As soon as the total light intensity reaching the cell 21 drops to a value of 28 foot candles, as indicated by the numeral 29, the auxiliary light source is extinguished, and the amount of light reaching the cell will be that shown in curve 27 to the right of the vertical line extending below the point 29.

It is, of course, obvious that the amount of illumination provided by the auxiliary light 24 may be varied within relatively wide limits, but I have drawn curves 25 and 26 and 27 and 28 with a difference of 10 units of light intensity therebetween. Provided that the variations of the light intensity on the outside of the box 22 do not exceed 10 light units, the system will operate as described above and, in case actual tests show that greater variations in light intensity will occur at daybreak or at nightfall, it is only necessary to provide a larger amount of auxiliary illumination.

The device and system embodying my invention thus provide a relatively simple and easily operated control system which is effective to prevent repeated energization and deenergization of any controlled circuit such as the lighting units shown incident to minor variations in the light intensity.

While, for purposes of illustration only, I have shown and described my invention as applied to a lighting circuit, I do not desire to be limited thereto, as it may obviously be used to control any work circuit or secondary control circuit. For instance, the circuit described might be employed to start up a generator in an automatic substation on the approach of darkness.

Various modifications may be made in the device and system embodying my invention without departing from the spirit and scope thereof, and I desire, therefore, that only such limitations shall be placed thereon as are imposed by the prior art or are set forth in the appended claims.

I claim as my invention:

1. In a control system, in combination, an energy-translating device to be controlled, a circuit controller therefor, a light-sensitive cell for controlling the energization of the circuit controller, a light source operatively associated with the cell, and means associated with the controller for energizing the light source when the energy-translating device is deenergized.

2. In a control system, the combination with a controlled circuit, a circuit controller therefor, and a light-sensitive cell for controlling the energization of the circuit controller, of a lamp operatively associated with the cell and means for causing energization of the lamp when the first named control circuit is deenergized.

3. In a control system, the combination with a controlled system, and means, including a light-sensitive cell subjected to varying light intensity, for controlling the energization of the controlled system, of means operatively associated with the cell for locally increasing the intensity of light to which the cell is subjected when the variable light intensity has increased to a predetermined value.

4. In a control system, the combination with a system to be controlled, and means, including a light-sensitive cell subjected to major variations of light intensity, for controlling the energization of the controlled system, of an auxiliary source of light operatively associated with the cell, and means for controlling the auxiliary light source to counteract the effect of minor variations of light intensity on the cell.

5. In a control system, the combination with a system to be controlled, and means, including a light-sensitive cell subjected to varying light intensity, for controlling the energization of the controlled system, of means operatively associated with the cell for locally decreasing the intensity of light to which the cell is subjected when the variable light intensity has decreased to a predetermined value.

6. In a control system, the combination with a system to be controlled, a circuit controller therefor and a light-sensitive cell subjected to a slow major increase of light intensity for controlling the operation of the circuit controller, of an auxiliary source of light operatively associated with the cell, and means associated with the circuit controlled for suddenly increasing the local light intensity to which the cell is subjected when the light intensity has reached a predetermined value by reason of the slow major increase.

7. In a control system, in combination, an energy-translating device to be controlled, a circuit controller therefor, a photo-sensitive device, subject to varying light intensity, for controlling the energization of said circuit controller, and regulating means operatively associated with said photo-sensitive device and responsive to the condition of said controller to abruptly increase the state of excitation of said photo-sensitive device when said translating device has been rendered inactive and to abruptly decrease the state of excitation of said photo-sensitive device when said translating device has been rendered active.

8. In a control system, in combination, an energy-translating device to be controlled, a current-responsive circuit controller therefor, a photo-sensitive device, subject to varying light intensity, for controlling the energization of said circuit controller, and regulating means operatively associated with said photo-sensitive device and responsive to the condition of said controller to abruptly increase the current exciting said controller when said translating device has been rendered inactive and to abruptly decrease the current exciting said controller when said translating device has been rendered active.

9. In a control system, in combination, an energy-translating device to be controlled, a circuit controller therefor, a photo-sensitive device, subject to varying light intensity, for controlling the energization of said circuit controller, and regulating means operatively associated with said photo-sensitive device and responsive to the condition of said controller to abruptly increase the state of energization of said controller when said translating device has been rendered inactive and to abruptly decrease the state of energization of said controller when said translating device has been rendered active.

10. Apparatus of the character described comprising a relay, a controller for energizing the relay, a circuit closed by the relay, a source of energy in said circuit, and a feed-back connection between said circuit and said controller whereby said source causes said controller to supply more energy to said relay the moment it is closed.

11. In a controlling system, in combination, a circuit to be controlled, a current responsive controller therefor, means responsive to a variable physical condition for actuating the controller from one circuit controlling position to a second circuit controlling position, means effective upon completion of movement of said controller from said one position to the second position for increasing the total value of the condition imposed on said condition responsive means, said last-mentioned means being effective to decrease the total value of the condition imposed on the condition responsive means after the controller has been moved from the second position to said one position, whereby relatively small changes in the value of the physical condition imposed on the condition responsive means are ineffective to actuate the controller.

12. In a controlling system, in combination, a circuit to be controlled, a current responsive controller therefor movable to a first and to a second circuit controlling position, means responsive to a variable physical condition for controlling the energization of said controller and for effecting movement thereof from said first to said second position and from said second to said first position, and means responsive to the position of said controller and operative when the controller is in said first position to modify the energization thereof in the same sense as the variation in energization causing operation of the controller to said first position and operative when the controller is in said second position to modify the energization thereof in the same sense as the variation in energization causing operation of the controller to said second position, so as to maintain the controlled circuit in the condition to which it has been last actuated by the controller to avoid a reverse operation upon a minor variation in said physical condition in the opposite sense.

DEWEY D. KNOWLES.